(12) United States Patent
Chong et al.

(10) Patent No.: US 8,856,003 B2
(45) Date of Patent: Oct. 7, 2014

(54) METHOD FOR DUAL CHANNEL MONITORING ON A RADIO DEVICE

(75) Inventors: Wei Tuck Chong, Penang (MY); Swee Aun Khor, Perak (MY); Ing Boh Wong, Perak (MY)

(73) Assignee: Motorola Solutions, Inc., Schaumburg, IL (US)

( * ) Notice: Subject to any disclaimer, the term of this patent is extended or adjusted under 35 U.S.C. 154(b) by 1046 days.

(21) Appl. No.: 12/112,453

(22) Filed: Apr. 30, 2008

(65) Prior Publication Data

US 2009/0276214 A1 Nov. 5, 2009

(51) Int. Cl.
| | |
|---|---|
| G10L 15/00 | (2013.01) |
| G10L 15/26 | (2006.01) |
| G10L 21/00 | (2013.01) |
| H04M 1/64 | (2006.01) |
| H04W 76/00 | (2009.01) |
| H04W 4/10 | (2009.01) |

(52) U.S. Cl.
CPC .............. *H04W 4/10* (2013.01); *H04W 76/005* (2013.01)
USPC ........ 704/235; 704/231; 704/270; 704/270.1; 379/67.1; 379/88.01; 379/88.13

(58) Field of Classification Search
USPC .................. 704/200–201, 211–215, 231–257, 704/270–271, 276, E17.001–E17.016, 704/E15.001–E15.05; 379/52, 56.1, 379/67.1–88.28, 90.01–108.02, 110.01, 379/142.01–142.18, 156–166, 177–187, 379/201.01–218.02, 219–241, 338; 455/403–466, 73–90.3
See application file for complete search history.

(56) References Cited

U.S. PATENT DOCUMENTS

| | | | |
|---|---|---|---|
| 3,692,947 | A | 9/1972 | Lewis |
| 3,761,624 | A | 9/1973 | Lewis et al. |
| 3,769,461 | A | 10/1973 | Lewis |
| 4,049,255 | A | 9/1977 | Stange et al. |
| 4,107,921 | A | 8/1978 | Iizuka |

(Continued)

FOREIGN PATENT DOCUMENTS

| | | |
|---|---|---|
| EP | 681778 B1 | 5/2002 |
| EP | 1303150 A1 | 4/2003 |

(Continued)

OTHER PUBLICATIONS

PCT Search Report Dated Nov. 23, 2009.

(Continued)

*Primary Examiner* — Pierre-Louis Desir
*Assistant Examiner* — David Kovacek
(74) *Attorney, Agent, or Firm* — Steven J. Cosgrove; Anthony P. Curtis; Daniel R. Bestor

(57) ABSTRACT

A method for dual channel monitoring on a radio device as provided enables efficient use of communication network resources. The method includes receiving at the radio device a first speech signal over a first channel, while simultaneously receiving at the radio device a second speech signal over a second channel. The first speech signal is then processed at the radio device to generate a text transcription of the first speech signal, and the text transcription of the first speech signal is displayed on a display screen of the radio device. An audible voice signal is then produced from a speaker that is operatively connected to the radio device simultaneously with displaying the text transcription of the first speech signal.

18 Claims, 4 Drawing Sheets

(56) References Cited

U.S. PATENT DOCUMENTS

| | | | |
|---|---|---|---|
| 4,135,059 A | 1/1979 | Schmidt | |
| 4,166,924 A | 9/1979 | Berkley et al. | |
| 4,313,036 A | 1/1982 | Jabara et al. | |
| 4,414,661 A * | 11/1983 | Karlstrom | 370/332 |
| 4,586,905 A | 5/1986 | Groff | |
| 4,649,567 A | 3/1987 | Childress | |
| 4,695,975 A | 9/1987 | Bedrij | |
| 4,750,171 A | 6/1988 | Kedar | |
| 4,818,987 A | 4/1989 | Ide et al. | |
| 4,982,322 A | 1/1991 | Eggers et al. | |
| 4,995,071 A | 2/1991 | Weber et al. | |
| 5,047,952 A * | 9/1991 | Kramer et al. | 704/271 |
| 5,347,566 A | 9/1994 | Law | |
| 5,363,402 A | 11/1994 | Harmon | |
| 5,420,911 A | 5/1995 | Dahlin et al. | |
| 5,473,605 A | 12/1995 | Grube et al. | |
| 5,506,890 A | 4/1996 | Gupta et al. | |
| 5,617,539 A * | 4/1997 | Ludwig et al. | 709/205 |
| 5,625,676 A | 4/1997 | Greco et al. | |
| 5,717,830 A | 2/1998 | Sigler et al. | |
| 5,718,631 A | 2/1998 | Invencion | |
| 5,724,410 A | 3/1998 | Parvulescu et al. | |
| 5,752,227 A | 5/1998 | Lyberg | |
| 5,809,018 A | 9/1998 | Lehmusto | |
| 5,809,427 A | 9/1998 | Perreault et al. | |
| 5,884,256 A | 3/1999 | Bennett et al. | |
| 5,899,867 A | 5/1999 | Collura | |
| 5,914,958 A | 6/1999 | Chinitz et al. | |
| 5,949,952 A * | 9/1999 | Bennett et al. | 386/200 |
| 5,970,141 A * | 10/1999 | Bennett et al. | 704/270 |
| 5,999,698 A | 12/1999 | Nakai et al. | |
| 5,999,825 A | 12/1999 | Geulen | |
| 6,081,202 A | 6/2000 | Dorenbosch | |
| 6,169,728 B1 | 1/2001 | Perreault et al. | |
| 6,173,259 B1 | 1/2001 | Bijl et al. | |
| 6,175,819 B1 | 1/2001 | Van Alstine | |
| 6,208,872 B1 | 3/2001 | Schmidt | |
| 6,219,548 B1 | 4/2001 | Feltner et al. | |
| 6,292,670 B1 | 9/2001 | Kauria et al. | |
| 6,342,903 B1 * | 1/2002 | Fado et al. | 715/716 |
| 6,360,152 B1 | 3/2002 | Ishibashi et al. | |
| 6,363,260 B1 | 3/2002 | Achour et al. | |
| 6,366,578 B1 * | 4/2002 | Johnson | 370/353 |
| 6,470,020 B1 | 10/2002 | Barker et al. | |
| 6,473,135 B1 | 10/2002 | Iwamura | |
| 6,483,899 B2 | 11/2002 | Agraharam et al. | |
| 6,484,037 B1 | 11/2002 | Schmidt et al. | |
| 6,487,219 B1 | 11/2002 | Snider | |
| 6,516,298 B1 * | 2/2003 | Kamai et al. | 704/260 |
| 6,542,200 B1 | 4/2003 | Barcy et al. | |
| 6,545,995 B1 | 4/2003 | Kinnunen et al. | |
| 6,567,371 B1 | 5/2003 | Otomo et al. | |
| 6,584,324 B1 | 6/2003 | Vivekanandan | |
| 6,587,450 B1 | 7/2003 | Pasanen | |
| 6,611,249 B1 | 8/2003 | Evanicky et al. | |
| 6,614,781 B1 | 9/2003 | Elliott et al. | |
| 6,714,826 B1 | 3/2004 | Curley et al. | |
| 6,725,052 B1 | 4/2004 | Raith | |
| 6,775,360 B2 | 8/2004 | Davidson et al. | |
| 6,778,644 B1 | 8/2004 | Jenkins et al. | |
| 6,785,649 B1 | 8/2004 | Hoory et al. | |
| 6,820,055 B2 | 11/2004 | Saindon et al. | |
| 6,850,609 B1 * | 2/2005 | Schrage | 379/202.01 |
| 6,907,112 B1 | 6/2005 | Guedalia et al. | |
| 6,952,590 B2 | 10/2005 | Legare et al. | |
| 6,987,855 B1 | 1/2006 | Srivastava | |
| 6,996,414 B2 | 2/2006 | Vishwanathan | |
| 7,062,439 B2 | 6/2006 | Brittan et al. | |
| 7,065,532 B2 | 6/2006 | Elder et al. | |
| 7,099,848 B1 | 8/2006 | Bratton | |
| 7,133,421 B1 * | 11/2006 | Puhakainen et al. | 370/498 |
| 7,170,980 B2 | 1/2007 | Lim | |
| 7,180,892 B1 | 2/2007 | Tackin | |
| 7,218,663 B1 | 5/2007 | Yokota et al. | |
| 7,221,928 B2 | 5/2007 | Laird et al. | |
| 7,310,517 B2 * | 12/2007 | Wolff et al. | 455/416 |
| 7,330,812 B2 * | 2/2008 | Ding | 704/200.1 |
| 7,489,767 B2 * | 2/2009 | Hikishima | 379/88.14 |
| 7,565,680 B1 * | 7/2009 | Asmussen | 725/135 |
| 7,908,320 B2 * | 3/2011 | Ludwig et al. | 709/204 |
| 8,150,922 B2 * | 4/2012 | Griffin et al. | 709/206 |
| 8,243,894 B2 * | 8/2012 | Katis et al. | 379/93.01 |
| 8,433,752 B2 * | 4/2013 | Mutikainen et al. | 709/204 |
| 2001/0005825 A1 * | 6/2001 | Engelke et al. | 704/235 |
| 2002/0039421 A1 | 4/2002 | Kirkeby | |
| 2002/0080024 A1 | 6/2002 | Nelson et al. | |
| 2002/0101353 A1 | 8/2002 | Radomsky et al. | |
| 2002/0101804 A1 | 8/2002 | Sawabe et al. | |
| 2002/0133342 A1 | 9/2002 | McKenna | |
| 2002/0151321 A1 | 10/2002 | Winchell et al. | |
| 2002/0171670 A1 | 11/2002 | Clernock et al. | |
| 2003/0016770 A1 | 1/2003 | Trans et al. | |
| 2003/0045317 A1 | 3/2003 | Pan et al. | |
| 2003/0055655 A1 * | 3/2003 | Suominen | 704/276 |
| 2003/0069023 A1 | 4/2003 | Toyryla | |
| 2003/0088397 A1 * | 5/2003 | Karas et al. | 704/1 |
| 2003/0097262 A1 | 5/2003 | Nelson | |
| 2003/0100274 A1 | 5/2003 | Brown | |
| 2003/0125072 A1 | 7/2003 | Dent | |
| 2003/0125940 A1 * | 7/2003 | Basson et al. | 704/231 |
| 2003/0138080 A1 | 7/2003 | Nelson et al. | |
| 2003/0163310 A1 | 8/2003 | Caldwell et al. | |
| 2003/0182554 A1 | 9/2003 | Gentry et al. | |
| 2004/0001458 A1 | 1/2004 | Dorenbosch et al. | |
| 2004/0002584 A1 | 1/2004 | Pena et al. | |
| 2004/0005904 A1 | 1/2004 | Wolf et al. | |
| 2004/0015547 A1 * | 1/2004 | Griffin et al. | 709/204 |
| 2004/0015548 A1 * | 1/2004 | Lee | 709/204 |
| 2004/0028003 A1 | 2/2004 | Diener et al. | |
| 2004/0029596 A1 | 2/2004 | Kim et al. | |
| 2004/0049389 A1 * | 3/2004 | Marko et al. | 704/260 |
| 2004/0121790 A1 * | 6/2004 | Wolff et al. | 455/518 |
| 2004/0136554 A1 | 7/2004 | Kirkeby | |
| 2004/0150724 A1 | 8/2004 | Nozaki et al. | |
| 2004/0172255 A1 | 9/2004 | Aoki et al. | |
| 2004/0190719 A1 | 9/2004 | Lo | |
| 2004/0215091 A1 | 10/2004 | Lohman et al. | |
| 2004/0229626 A1 | 11/2004 | Yi et al. | |
| 2005/0021616 A1 | 1/2005 | Rajahalme et al. | |
| 2005/0034079 A1 * | 2/2005 | Gunasekar et al. | 715/753 |
| 2005/0049879 A1 | 3/2005 | Audu et al. | |
| 2005/0074026 A1 | 4/2005 | Soncodi et al. | |
| 2005/0099275 A1 | 5/2005 | Kamdar et al. | |
| 2005/0122958 A1 | 6/2005 | Shim et al. | |
| 2005/0136912 A1 | 6/2005 | Curatolo et al. | |
| 2005/0160270 A1 | 7/2005 | Goldberg et al. | |
| 2005/0170856 A1 | 8/2005 | Keyani et al. | |
| 2005/0187766 A1 * | 8/2005 | Rennillo et al. | 704/235 |
| 2005/0190740 A1 | 9/2005 | Zhao et al. | |
| 2005/0213518 A1 * | 9/2005 | Ahya et al. | 370/276 |
| 2005/0227705 A1 | 10/2005 | Rousu et al. | |
| 2005/0232111 A1 | 10/2005 | Sawabe et al. | |
| 2005/0249153 A1 | 11/2005 | Park et al. | |
| 2005/0250550 A1 | 11/2005 | Fields | |
| 2005/0266829 A1 | 12/2005 | Tran et al. | |
| 2005/0273330 A1 * | 12/2005 | Johnson | 704/246 |
| 2005/0288559 A1 | 12/2005 | Feliss et al. | |
| 2005/0288563 A1 | 12/2005 | Feliss et al. | |
| 2005/0288737 A1 | 12/2005 | Feliss et al. | |
| 2005/0288926 A1 | 12/2005 | Benco et al. | |
| 2006/0004262 A1 | 1/2006 | Feliss et al. | |
| 2006/0004263 A1 | 1/2006 | Feliss et al. | |
| 2006/0017821 A1 | 1/2006 | Garvey et al. | |
| 2006/0019681 A1 | 1/2006 | Harris et al. | |
| 2006/0041916 A1 | 2/2006 | McQuaide | |
| 2006/0053225 A1 | 3/2006 | Poikselka et al. | |
| 2006/0053380 A1 * | 3/2006 | Spataro et al. | 715/753 |
| 2006/0058007 A1 | 3/2006 | Choksi | |
| 2006/0089154 A1 | 4/2006 | Laroia et al. | |
| 2006/0155267 A1 | 7/2006 | Berzak et al. | |
| 2006/0182236 A1 | 8/2006 | Kapoor | |
| 2006/0182245 A1 | 8/2006 | Steinmetz | |
| 2006/0227886 A1 | 10/2006 | Li et al. | |
| 2006/0229883 A1 | 10/2006 | Vanderbaan et al. | |

(56) References Cited

U.S. PATENT DOCUMENTS

| | | | |
|---|---|---|---|
| 2006/0240831 A1 | 10/2006 | Toskala et al. | |
| 2006/0276214 A1 | 12/2006 | Harris et al. | |
| 2007/0008956 A1 | 1/2007 | Moran et al. | |
| 2007/0011235 A1* | 1/2007 | Mutikainen et al. | 709/204 |
| 2007/0027637 A1 | 2/2007 | Delenstarr et al. | |
| 2007/0058671 A1 | 3/2007 | Hart et al. | |
| 2007/0071206 A1* | 3/2007 | Gainsboro et al. | 379/168 |
| 2007/0088553 A1* | 4/2007 | Johnson | 704/257 |
| 2007/0106127 A1 | 5/2007 | Alman | |
| 2007/0112571 A1 | 5/2007 | Thirugnana | |
| 2007/0133435 A1 | 6/2007 | Eneroth et al. | |
| 2007/0133437 A1* | 6/2007 | Wengrovitz et al. | 370/260 |
| 2007/0155312 A1 | 7/2007 | Goldberg et al. | |
| 2007/0155313 A1 | 7/2007 | Goldberg et al. | |
| 2007/0197248 A1 | 8/2007 | Reich et al. | |
| 2007/0239429 A1* | 10/2007 | Johnson et al. | 704/8 |
| 2007/0280435 A1* | 12/2007 | Smith | 379/67.1 |
| 2007/0288129 A1* | 12/2007 | Komer et al. | 701/3 |
| 2008/0096603 A1* | 4/2008 | Sparre | 455/550.1 |
| 2009/0070109 A1* | 3/2009 | Didcock et al. | 704/235 |
| 2009/0276214 A1* | 11/2009 | Chong et al. | 704/235 |
| 2010/0030557 A1* | 2/2010 | Molloy et al. | 704/235 |

FOREIGN PATENT DOCUMENTS

| | | | |
|---|---|---|---|
| EP | 1517567 A2 | | 3/2005 |
| EP | 1569473 A1 | | 8/2005 |
| EP | 1587257 A1 | | 10/2005 |
| EP | 1362444 B1 | | 2/2007 |
| EP | 1821452 A1 | | 8/2007 |
| GB | 271690 A | | 6/1927 |
| GB | 287607 A | | 3/1928 |
| GB | 476849 A | | 12/1937 |
| GB | 2293523 | * | 3/1996 |
| WO | 8705767 A1 | | 9/1987 |
| WO | 8705768 A1 | | 9/1987 |
| WO | 9413107 A1 | | 6/1994 |
| WO | 9606490 A1 | | 2/1996 |
| WO | 0016586 A1 | | 3/2000 |
| WO | 0030375 A2 | | 5/2000 |
| WO | 0035232 A1 | | 6/2000 |
| WO | 0038439 A2 | | 6/2000 |
| WO | 0122710 A2 | | 3/2001 |
| WO | 0131964 A1 | | 5/2001 |
| WO | 0161995 A1 | | 8/2001 |
| WO | 0167674 A2 | | 9/2001 |
| WO | 0219561 A2 | | 3/2002 |
| WO | 2005086022 A1 | | 9/2005 |
| WO | 2005094095 A1 | | 10/2005 |
| WO | 2005101742 A1 | | 10/2005 |
| WO | 2006100475 A1 | | 9/2006 |
| WO | 2006132615 A2 | | 12/2006 |
| WO | 2007093675 A1 | | 8/2007 |

OTHER PUBLICATIONS

English translation of second Office Action for counterpart Chinese Patent Application No. 200980114906.3 mailed on Apr. 28, 2013.

International Preliminary Report on Patentability and Written Opinion dated Nov. 2, 2010 for International Application No. PCT/US2009/039705.

Chinese Office Action Dated Nov. 16, 2012 for Counterpart Application 200980114906.3.

* cited by examiner

US 8,856,003 B2

METHOD FOR DUAL CHANNEL MONITORING ON A RADIO DEVICE

FIELD OF THE DISCLOSURE

The present disclosure relates generally to mobile communication devices, and in particular, but not exclusively, to simultaneously monitoring multiple voice communications on a radio device.

BACKGROUND

For many decades, half duplex two way radio networks have provided reliable and convenient communications using limited shared radio resources. For example, "walkie-talkie" and citizens band (CB) radio networks have enabled users to maintain direct communication channels with other users over extended periods of time. The push-to-talk (PTT) and "instant on" features of half duplex radio devices provide desirable modes of wireless communication for users such as truckers, construction and industrial site personnel, military personnel, taxi dispatchers, police and fire personnel and numerous others. Modern communications systems designed for public safety still typically allocate only one logical media stream in a network, which is shared among network participants. A floor control mechanism then dictates which device in the network is permitted to send media at a given time on a given stream.

Push-to-talk over cellular (PoC) is a recent technology that enables familiar PTT and "instant on" features of conventional half duplex radios, but using mobile communication devices operating over modern cellular telecommunications networks. Using PoC, wireless communication devices such as mobile telephones and notebook computers can therefore function as PTT half-duplex radio devices. Other types of multimedia call models (MMCMs) are also available that provide functionality similar to PoC.

Floor control in a PoC or MMCM session is generally maintained by a PoC or MMCM network server that controls communications between two or more wireless communication devices. When a user of one of the communication devices keys a PTT button, a request for permission to speak in the PoC or MMCM session is transmitted from the user's device to the PoC or MMCM server using, for example, a real-time transport protocol (RTP) message. If no other users are currently speaking in the PoC or MMCM session, an acceptance message is transmitted back to the user's device and the user can then speak into a microphone of the device. Using standard compression/decompression (codec) techniques, the user's voice is digitized and transmitted using discrete voice data packets, such as according to RTP and internet protocols (IP), to the PoC or MMCM server. The PoC or MMCM server then transmits the voice data packets to other users of the PoC or MMCM session, using for example a point to multipoint communication technique.

PoC and conventional PTT radio users sometimes need to monitor more than one wireless communication channel simultaneously. For example, a member of an emergency response network may need to monitor two talk groups, where each talk group is assigned to a specific response team, but where each talk group is broadcasting over a separate logical radio channel. The member of the emergency response network may therefore be required to carry two radios, where one radio is tuned to the first talk group and the second radio is tuned to the second talk group. Alternatively, the member of the emergency response network may repetitively re-tune a single radio, first to one talk group and then to another talk group. However, carrying multiple radio devices or repetitively re-tuning a radio can be inconvenient and inefficient.

BRIEF DESCRIPTION OF THE DRAWINGS

In order that the disclosure may be readily understood and put into practical effect, reference will now be made to exemplary embodiments as illustrated with reference to the accompanying figures, wherein like reference numbers refer to identical or functionally similar elements throughout the separate views. The figures together with a detailed description below, are incorporated in and form part of the specification, and serve to further illustrate the embodiments and explain various principles and advantages, in accordance with the present disclosure, where.

Figure 1:
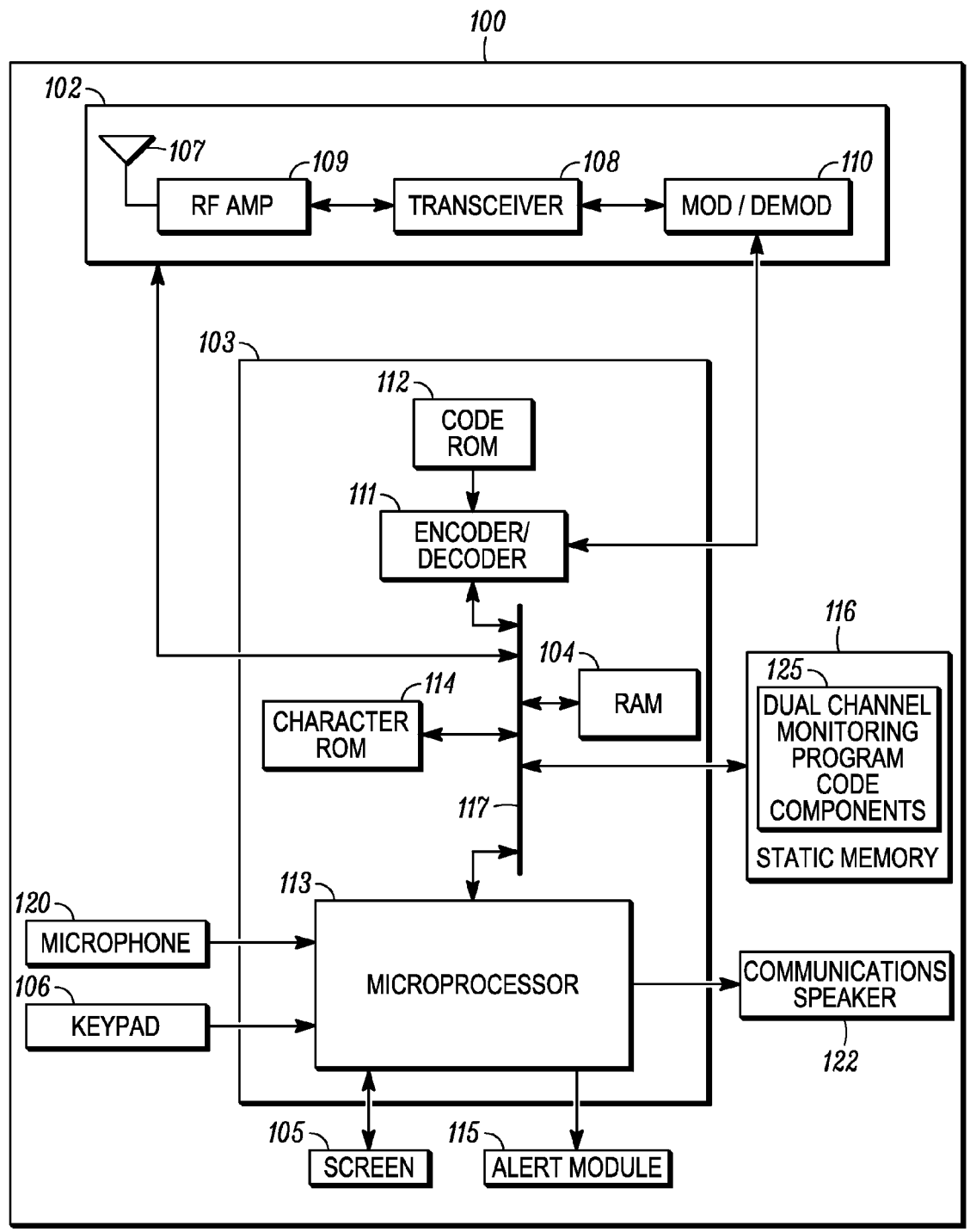
FIG. 1 is a schematic diagram illustrating an electronic device in the form of a mobile radio, according to some embodiments of the disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION

Before describing in detail embodiments that are in accordance with the present disclosure, it should be observed that the embodiments reside primarily in combinations of method steps and apparatus components related to dual channel monitoring on a radio device. Accordingly, the apparatus components and method steps have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, device or apparatus that comprises a list of elements does not include only those elements but may include other elements not expressly listed or inherent to such process, method, article, device or apparatus. An element preceded by "comprises a . . . " does not, without more constraints, preclude the existence of additional identical elements in the process, method, article, device or apparatus that comprises the element.

Referring to FIG. 1, a schematic diagram illustrates an electronic device in the form of a mobile radio 100, according to some embodiments of the present disclosure. The mobile radio 100 comprises a radio frequency communications unit 102 coupled to be in communication with a common data and address bus 117 of a processor 103. The mobile radio 100 also has a keypad 106 and a display screen 105, such as a touch screen coupled to be in communication with the processor 103.

The processor 103 also includes an encoder/decoder 111 with an associated code Read Only Memory (ROM) 112 for storing data for encoding and decoding voice or other signals that may be transmitted or received by the mobile radio 100. The processor 103 further includes a microprocessor 113 coupled, by the common data and address bus 117, to the encoder/decoder 111, a character ROM 114, a Random Access Memory (RAM) 104, and a programmable memory 116.

The radio frequency communications unit 102 is a combined receiver and transmitter having a common antenna 107. The communications unit 102 has a transceiver 108 coupled to the antenna 107 via a radio frequency amplifier 109. The transceiver 108 is also coupled to a combined modulator/demodulator 110 that is coupled to the encoder/decoder 111.

The microprocessor 113 has ports for coupling to the keypad 106 and to the display screen 105. The microprocessor 113 further has ports for coupling to an alert module 115 that typically contains an alert speaker, vibrator motor and associated drivers; to a microphone 120; and to a communications speaker 122. The character ROM 114 stores code for decoding or encoding data such as control channel messages that may be transmitted or received by the communications unit 102. In some embodiments of the present disclosure, the character ROM 114 or the programmable memory 116 also can store operating code (OC) for the microprocessor 113 and code for performing functions associated with the mobile radio 100. For example, the programmable memory 116 can comprise dual channel monitoring computer readable program code components 125 configured to cause execution of a method for dual channel monitoring, as described herein, including displaying on the display screen 105 a transcription of a speech signal while simultaneously producing an audible voice signal over the communications speaker 122.

Thus, some embodiments of the present disclosure include a method for dual channel monitoring on a radio device such as the mobile radio 100. The method includes receiving at the radio device a first speech signal over a first channel, while simultaneously receiving at the radio device a second speech signal over a second channel. The first speech signal is then processed at the radio device to generate a text transcription of the first speech signal, and the text transcription of the first speech signal is then displayed on a display screen of the radio device. An audible voice signal is produced from a speaker that is operatively connected to the radio device simultaneously with displaying the text transcription of the first speech signal.

Some embodiments of the present disclosure include a radio device comprising computer readable program code components configured to cause receiving, at the radio device, a first speech signal over a first channel. The device also has computer readable program code components configured to cause receiving, at the radio device, simultaneously with the first speech signal, a second speech signal over a second channel. There are computer readable program code components, configured to cause processing the first speech signal at the radio device, to generate a text transcription of the first speech signal and computer readable program code components configured to cause displaying the text transcription of the first speech signal on a display screen of the radio device. The device also has computer readable program code components configured to cause producing, from the second speech signal, an audible voice signal from a speaker that is operatively connected to the radio device, wherein producing the audible voice signal is performed simultaneously with displaying the text transcription of the first speech signal.

Some embodiments of the present disclosure include a radio device, comprising: means for receiving at the radio device a first speech signal over a first channel; means for receiving at the radio device, simultaneously with the first speech signal, a second speech signal over a second channel; means for processing the first speech signal at the radio device to generate a text transcription of the first speech signal; means for displaying the text transcription of the first speech signal on a display screen of the radio device; and means for producing from the second speech signal an audible voice signal from a speaker that is operatively connected to the radio device, wherein producing the audible voice signal is performed simultaneously with displaying the text transcription of the first speech signal.

Some embodiments of the present disclosure therefore enable a user of a radio device to simultaneously monitor two radio channels. Such monitoring can be performed efficiently using only a single transceiver, and a transcription of a speech signal can be recorded at the radio device. Thus, multiple voice communications can be monitored simultaneously, and without a need to use multiple radios or to repetitively retune a radio. Further, some embodiments of the present disclosure enable a more efficient use of wireless communication network resources, because users are able to monitor two talk groups while transmitting to only one talk group. Thus, unnecessary broadcast transmissions can be eliminated.

Figure 2:
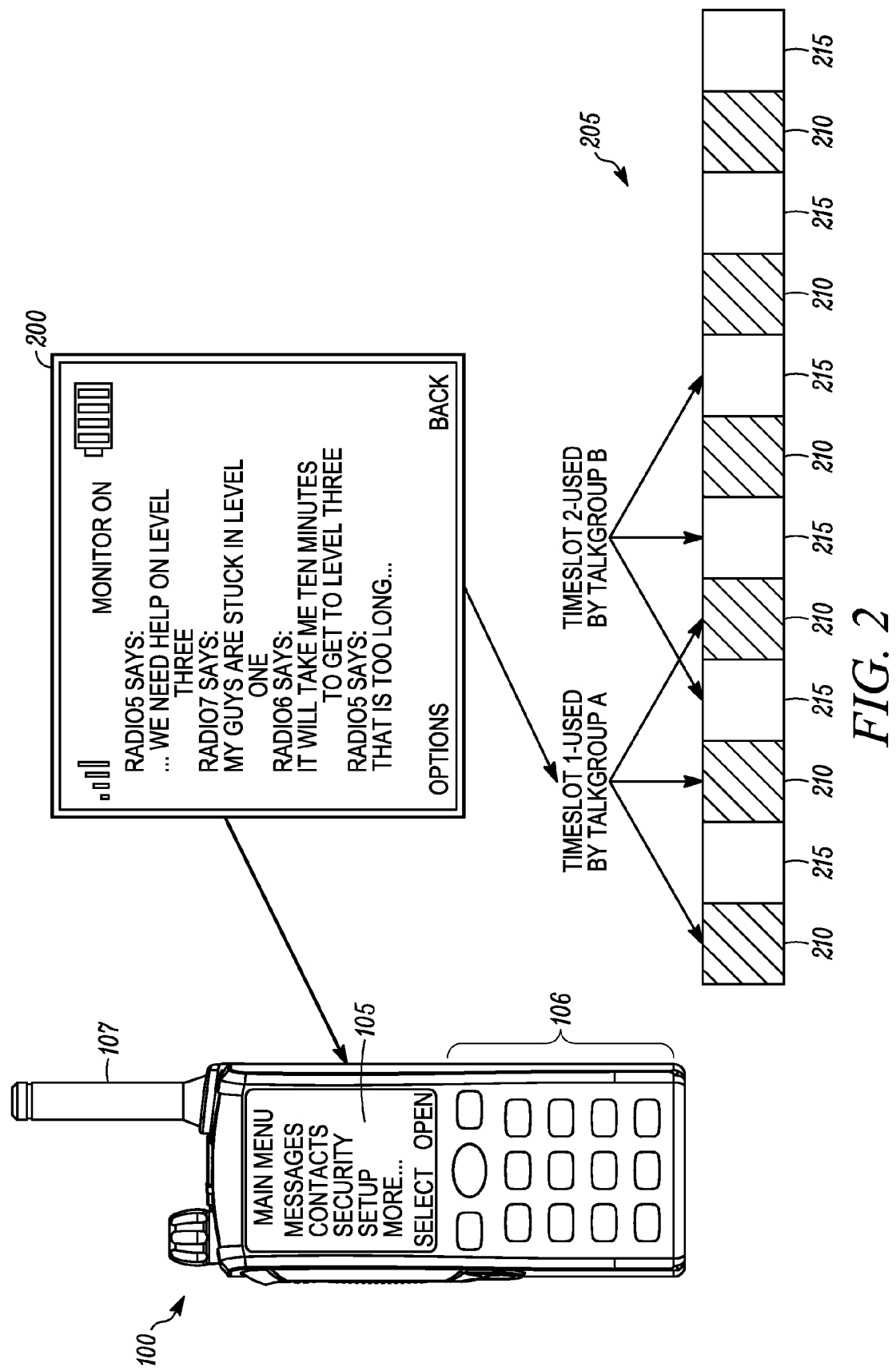
FIG. 2 is a diagram illustrating an embodiment of a mobile radio, an example of a speech signal transcription as provided on a display screen, and a block illustrating a time division multiplexing of two speech signals, according to some embodiments of the disclosure.

Referring to FIG. 2, a diagram illustrates an embodiment of the mobile radio 100, an example of a speech signal transcription 200 as provided on the display screen 105, and a block 205 illustrating a time division multiplexing of two speech signals, according to some embodiments of the present disclosure. As illustrated, consider that a Talkgroup A, which includes as members a radio 5, a radio 6, and a radio 7, is transmitting over one logical speech channel associated with a physical channel to which the mobile radio 100 is tuned. The speech signal transcription 200 thus includes a transcript of the conversation between these Talkgroup A members. For example, a user of the radio 5 may have broadcast a voice signal stating " . . . we need help on level three"; and a user of the radio 7 may have replied with a voice signal stating "My guys are stuck in level one". The speech signal transcription 200 thus includes the text corresponding to such voice signals. The symbol " . . . " may be used to indicate a Talkgroup user unmuting his or her radio, but where no discernable speech is detected.

Further, consider that simultaneously, as shown in block 205, the mobile radio 100 receives another speech signal associated with a Talkgroup B that also has multiple users. A time division multiplexing technique, such as time division multiple access (TDMA), which is well known by those having ordinary skill in the art, enables data packets 210 from Talkgroup A to be multiplexed over a single physical channel with data packets 215 from Talkgroup B. Thus, Talkgroup A and Talkgroup B can transmit over distinct logical channels multiplexed over a single physical channel.

Therefore, a user of the mobile radio 100 can monitor a conversation of Talkgroup A by reading the speech signal transcription 200 displayed on the display screen 105, while simultaneously listening to a conversation of Talkgroup B that is played over the communication speaker 122. Further, the user of the mobile radio 100 can contribute to the conversation of Talkgroup B by keying a PTT button on the keypad 106, or elsewhere on the mobile radio 100, and then speaking into the microphone 120.

According to the embodiment illustrated in FIG. 2, speech to text processing software installed on the mobile radio 100, such as in the programmable memory 116, is used to transcribe an audio based speech signal to a text transcription such as the speech signal transcription 200. Those having ordinary skill in art will appreciate that various speech to text software that can perform such transcription are readily and commercially available. For example, relevant speech to text software is described in detail in U.S. Pat. No. 5,884,256 to Bennett et al., titled "Networked Stenographic System with Real-time Speech to Text Conversion for Down-line Display and Annotation", issued Mar. 16, 1999, and hereby incorporated herein by reference.

Figure 3:
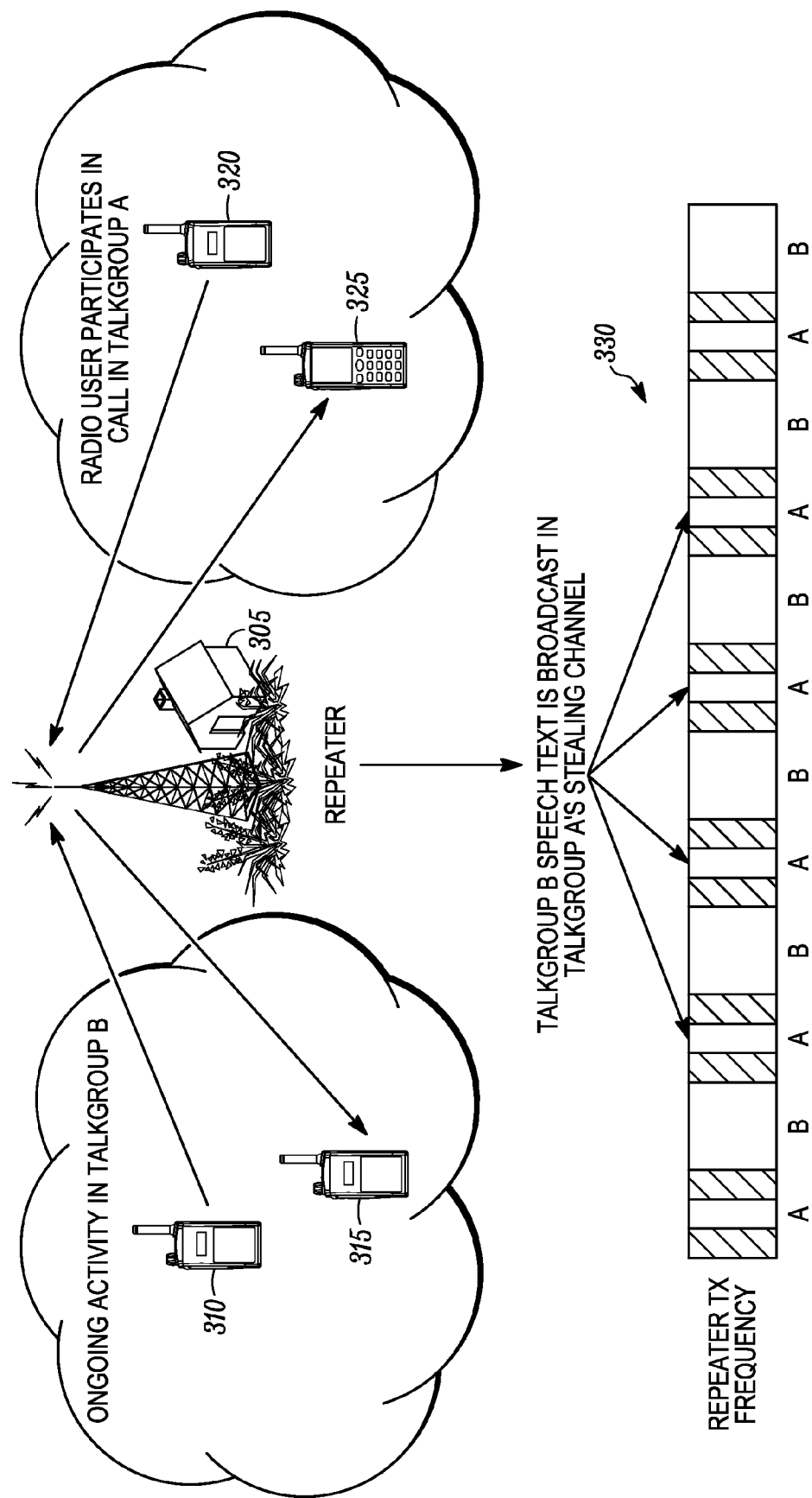
FIG. 3 is a network diagram illustrating a method for dual channel monitoring on a radio device, according to some alternative embodiments of the disclosure.

Referring to FIG. 3, a network diagram illustrates a method for dual channel monitoring on a radio device, according to some alternative embodiments of the present disclosure. As shown, a single repeater station, such as a repeater station 305 operating in a wireless communication network, receives wireless speech signals from both a radio 310 and a radio 315 that are transmitting over a logical channel designated as a Talkgroup B. The repeater station 305 then converts the wireless speech signals of Talkgroup B to a text transcription. To perform such a conversion, the repeater station 305 employs, for example, commercially available speech to text software such as that referenced above.

Next, the repeater station 305 broadcasts the text transcription of the wireless speech signals of Talkgroup B over a "stealing channel" of a primary speech channel assigned to a Talkgroup A. For example, the Talkgroup A may include a radio 320 and a dual channel monitoring radio 325. The dual channel monitoring radio 325 may be very similar to the mobile radio 100, but does not require a speech to text conversion capability because such conversion is pre-executed at the repeater station 305.

A user of the dual channel monitoring radio 325 thus can monitor a conversation of Talkgroup B by reading a transcription, similar to the speech signal transcription 200, while simultaneously listening to a conversation of Talkgroup A that is played over a speaker of the dual channel monitoring radio 325. Further, the user of the dual channel monitoring radio 325 can contribute to the conversation of Talkgroup A by, for example, keying a PTT button on the dual channel monitoring radio 325.

Block 330 illustrates a transmission frequency of two multiplexed speech channels broadcast by the repeater station 305, including the use of a "stealing channel". Use of such stealing channels is well known to those having ordinary skill in the art, and generally concerns multiplexing signaling information over a voice traffic channel. For example, the TETRA (Terrestrial, Trunked Radio) digital mobile communications system employs such stealing channels. Use of stealing channels in association with the TETRA system are described in detail in U.S. Pat. No. 7,133,421 titled "Method and Equipment for Identifying a Logical Channel", issued Nov. 7, 2006, and hereby incorporated by reference herein in its entirety. Thus, for the purposes of the present disclosure, both a signal transmitted over a stealing channel including an encoded transcription of a voice signal, and a voice signal transmitted over an associated primary speech channel are designated as speech signals.

Figure 4:
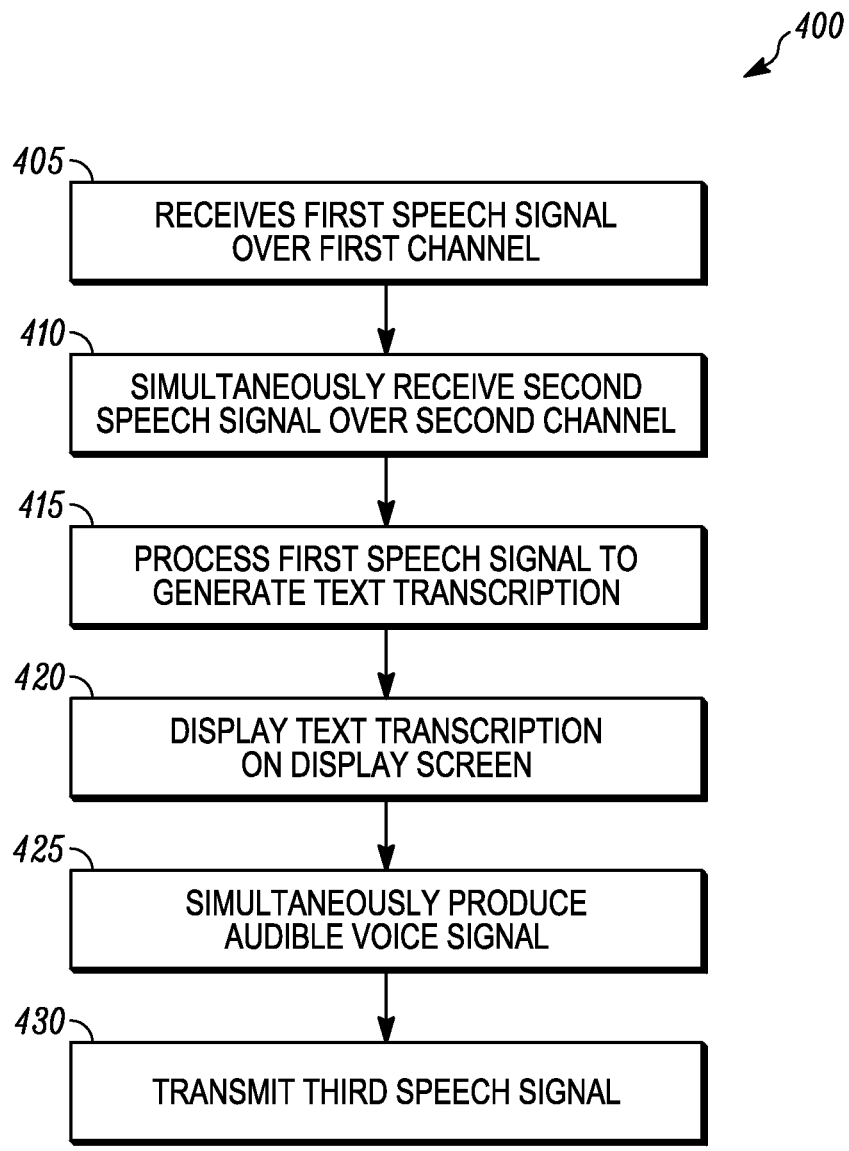
FIG. 4 is a general flow diagram illustrating a method for dual channel monitoring on a radio device, according to some embodiments of the disclosure.

Referring to FIG. 4, a general flow diagram illustrates a method for dual channel monitoring on a radio device, according to some embodiments of the present disclosure. At step 405, the radio device receives a first speech signal over a first channel. For example, referring again to FIG. 2, the mobile radio 100 receives a first speech signal from Radio 5 that is a member of a Talkgroup A. Alternatively, referring again to FIG. 3, the dual channel monitoring radio 325 receives a first speech signal from the repeater station 305 that comprises a text transcription of the wireless speech signals of a Talkgroup B transmitted over a "stealing channel" of the primary speech channel assigned to a Talkgroup A.

At step 410, the radio device receives, simultaneously with the first speech signal, a second speech signal over a second channel. For example, the mobile radio 100 receives a second speech signal from a Talkgroup B. Alternatively, the dual channel monitoring radio 325 receives a second speech signal from the repeater station 305 that comprises an audio based speech signal from a Talkgroup A.

At step 415, the first speech signal is processed at the radio device to generate a text transcription of the first speech signal. For example, the mobile radio 100 uses speech to text software stored in the programmable memory 116 to generate a text transcription of a conversation of a Talkgroup A. Alternatively, as described above concerning the dual channel monitoring radio 325, generating a text transcription can include a process of formatting pre-transcribed text that is included in a stealing channel. Thus the first speech signal may comprise coded text that was previously transcribed using speech to text software.

At step 420, the text transcription of the first speech signal is displayed on a display screen of the radio device. For example, the speech signal transcription 200 is displayed on the display screen 105 of the mobile radio 100.

At step 425, an audible voice signal is produced from the second speech signal using a speaker that is operatively connected to the radio device, where producing the audible voice signal is performed simultaneously with displaying the text transcription of the first speech signal. For example, a user of the mobile radio 100 can monitor a conversation of Talkgroup A by reading the speech signal transcription 200 displayed on the display screen 105, while simultaneously listening to a conversation of Talkgroup B that is played over the communication speaker 122.

At step 430, a third speech signal is transmitted from the radio device over the second channel using a PTT feature of the radio device. For example, the user of the mobile radio 100 can contribute to the conversation of Talkgroup B by keying a PTT button on the keypad 106, or elsewhere on the mobile radio 100, and then speaking into the microphone 120.

Advantages of the present disclosure thus include enabling a user of a radio device to simultaneously monitor two radio channels. Such monitoring can be performed efficiently using only a single transceiver, and a transcription of a speech signal can be recorded at the radio device. Thus, multiple voice communications can be monitored simultaneously, and without a need to use multiple radios or to repetitively retune a radio. Further, some embodiments of the present disclosure enable a more efficient use of wireless communication network resources, because users are able to monitor two talk groups while transmitting to only one talk group. Thus, unnecessary broadcast transmissions can be eliminated.

It will be appreciated that embodiments of the disclosure described herein may be comprised of one or more conventional processors and unique stored program instructions that control the one or more processors to implement, in conjunction with certain non-processor circuits, some, most, or all of the functions of dual channel monitoring on a radio device as described herein. The non-processor circuits may include, but are not limited to, a radio receiver, a radio transmitter, signal drivers, clock circuits, power source circuits, and user input devices. As such, these functions may be interpreted as steps of a method for dual channel monitoring on a radio device. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

In the foregoing specification, specific embodiments of the present disclosure have been described. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure. The benefits, advantages, solutions to problems, and any elements that may cause any benefit, advantage, or solution to occur or become more pronounced are not to be construed as critical, required, or essential features or elements of any or all of the claims. The invention is defined solely by the appended claims including any amendments made during the pendency of this application and all equivalents of those claims.

We claim:

1. A method for dual channel monitoring on a radio device, the method comprising:
    receiving, by the radio device, a first speech signal over a first channel associated with a first active talkgroup to which the radio device is subscribed;
    receiving, by the radio device, simultaneously with the first speech signal, a second speech signal over a second channel associated with a second active talkgroup to which the radio device is also subscribed;
    processing the first speech signal, by the radio device, to generate a text transcription of the first speech signal;
    displaying, by the radio device, the text transcription of the first speech signal on a display screen of the radio device; and
    producing, by the radio device, from the second speech signal a first audible voice signal from a speaker that is operatively connected to the radio device without producing a second audible voice signal from the first speech signal, wherein the producing the first audible voice signal is performed simultaneously with the displaying the text transcription of the first speech signal.

2. The method of claim 1, further comprising the radio device transmitting a third speech signal from the radio device over the second channel using a push to talk feature of the radio device.

3. The method of claim 1, wherein the first channel and the second channel are distinct logical channels multiplexed over a single physical channel.

4. The method of claim 1, wherein the first channel and the second channel are each time division multiple access (TDMA) channels.

5. The method of claim 1, wherein the first talk group has multiple users and the second talk group has multiple users.

6. The method of claim 1, wherein both the first speech signal and the second speech signal are transmitted to the radio device from a single repeater station.

7. The method of claim 1, wherein the generated and displayed text transcription includes identifiers of one or more particular radios that are providing the first speech signal.

8. The method of claim 1, wherein the generated and displayed text transcription includes a symbol indicative of a failure to detect discernable speech in the first speech signal.

9. The method of claim 1, wherein the step of displaying, by the radio device, the text transcription of the first speech signal on a display screen of the radio device includes not displaying a second text transcription of the second speech signal.

10. A radio device, comprising:
    a display;
    a speaker;
    a processor;
    a transceiver; and
    a memory having instructions stored thereon that, in response to execution by the processor, cause the processor to perform operations comprising:
        receiving, via the transceiver, a first speech signal over a first channel associated with a first active talkgroup to which the radio device is subscribed;
        receiving, via the transceiver, and simultaneously with the first speech signal, a second speech signal over a second channel associated with a second active talkgroup to which the radio device is also subscribed;
        processing the first speech signal to generate a text transcription of the first speech signal;
        displaying the text transcription of the first speech signal on the display; and
        producing from the second speech signal a first audible voice signal from the speaker without producing a second audible voice signal from the first speech signal, wherein the producing the first audible voice signal is performed simultaneously with the displaying the text transcription of the first speech signal.

11. The radio device of claim 10, wherein the operations further comprise transmitting, via the transceiver, a third speech signal from the radio device over the second channel using a push to talk feature of the radio device.

12. The radio device of claim 10, wherein the first channel and the second channel are distinct logical channels multiplexed over a single physical channel.

13. The radio device of claim 10, wherein the first channel and the second channel are each time division multiple access (TDMA) channels.

14. The radio device of claim 10, wherein the first talk group has multiple users and the second talk group has multiple users.

15. The radio device of claim 10, wherein both the first speech signal and the second speech signal are transmitted from a single repeater station.

16. The radio device of claim 10, wherein the operation of displaying the text transcription of the first speech signal on a display screen of the radio device includes not displaying a second text transcription of the second speech signal.

17. A method for supporting dual channel monitoring on a radio device, the method comprising:
    receiving, by a radio repeater station, a first speech signal associated with a first active talkgroup;

receiving, by the radio repeater station, simultaneously with the first speech signal, a second speech signal associated with a second active talkgroup;

processing the first speech signal, by the radio repeater station, to generate a text transcription of the first speech signal;

responsive to receiving the second speech signal, the radio repeater station repeating the second speech signal by substantially immediately broadcasting the second speech signal to a group of radio devices subscribed to both the first talkgroup and the second talkgroup, on a primary speech channel associated with the second talkgroup; and the radio repeater station broadcasting the text transcription of the first speech channel, to the group of radio devices subscribed to both the first talkgroup and the second talkgroup, on secondary speech channel associated with the first talkgroup, simultaneously with the broadcasting the second speech signal.

18. The method of claim 17, wherein broadcasting the text transcription of the first speech channel comprises broadcasting the text transcription of the first speech channel to the group of radio devices on a stealing channel of the primary speech channel.

* * * * *